Jan. 19, 1965      E. M. KELLY      3,166,502
SLUDGE DISCHARGE MEANS FOR SEDIMENTATION APPARATUS
Filed Sept. 12, 1960      4 Sheets-Sheet 1

INVENTOR.
EARL M. KELLY
BY
ATTORNEY

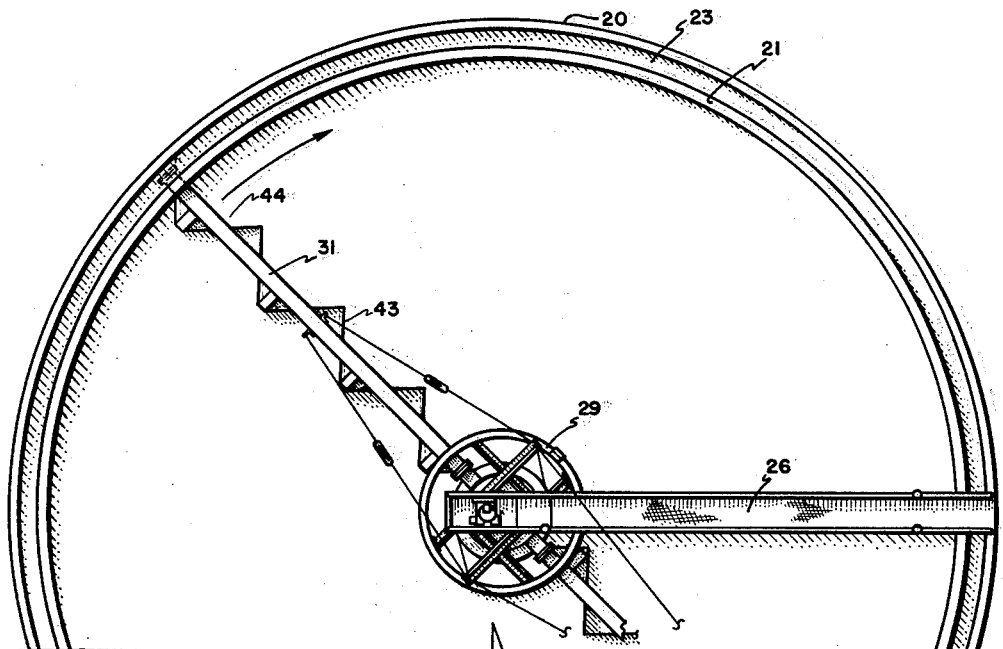
FIG. 2
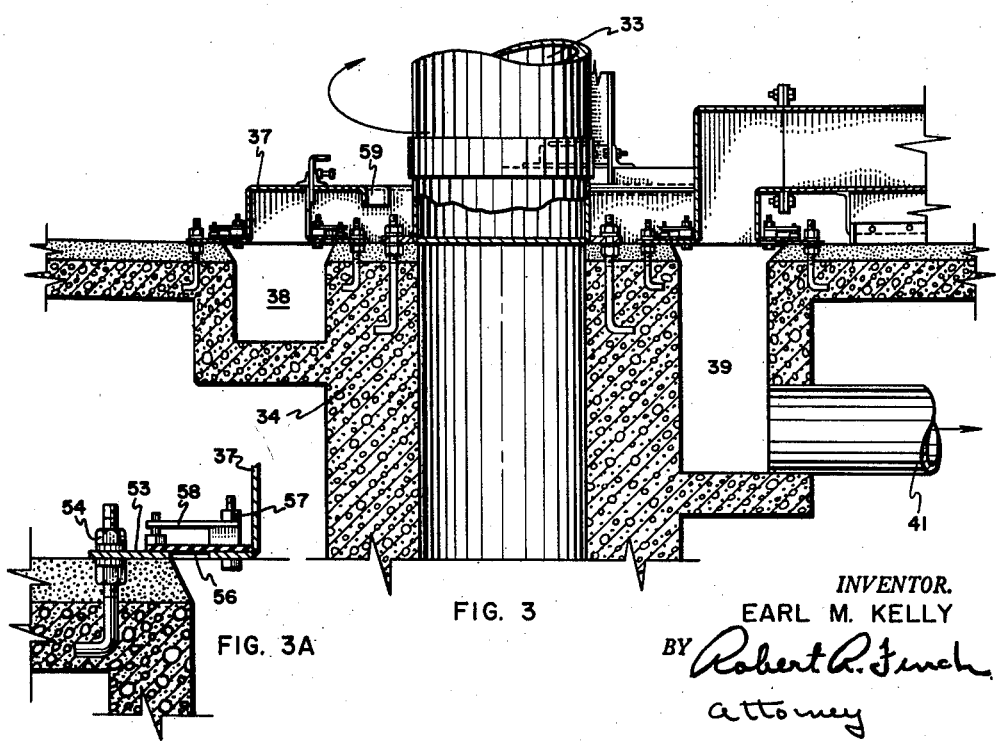
FIG. 3
FIG. 3A
INVENTOR.
EARL M. KELLY

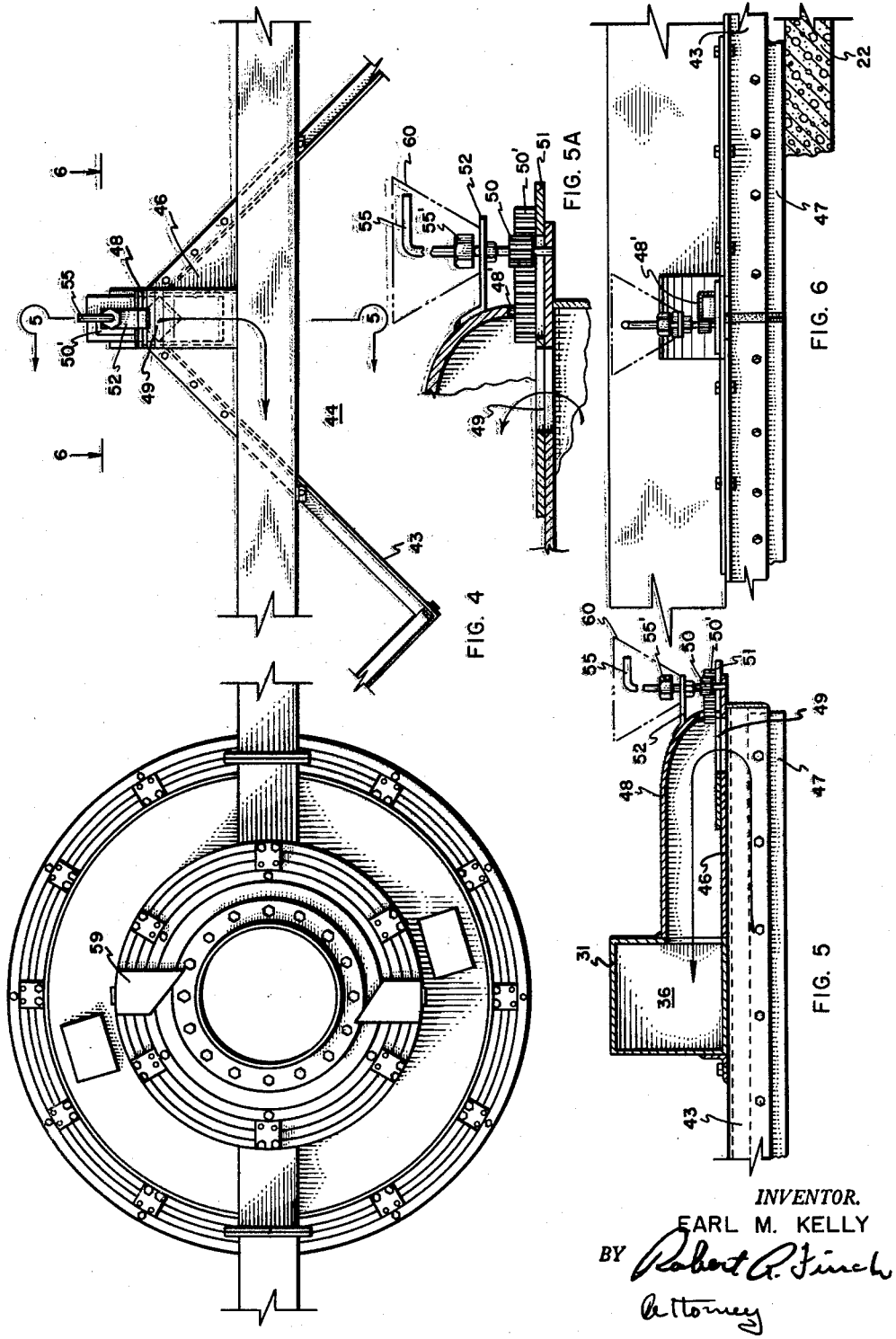

Jan. 19, 1965  E. M. KELLY  3,166,502
SLUDGE DISCHARGE MEANS FOR SEDIMENTATION APPARATUS
Filed Sept. 12, 1960  4 Sheets-Sheet 4
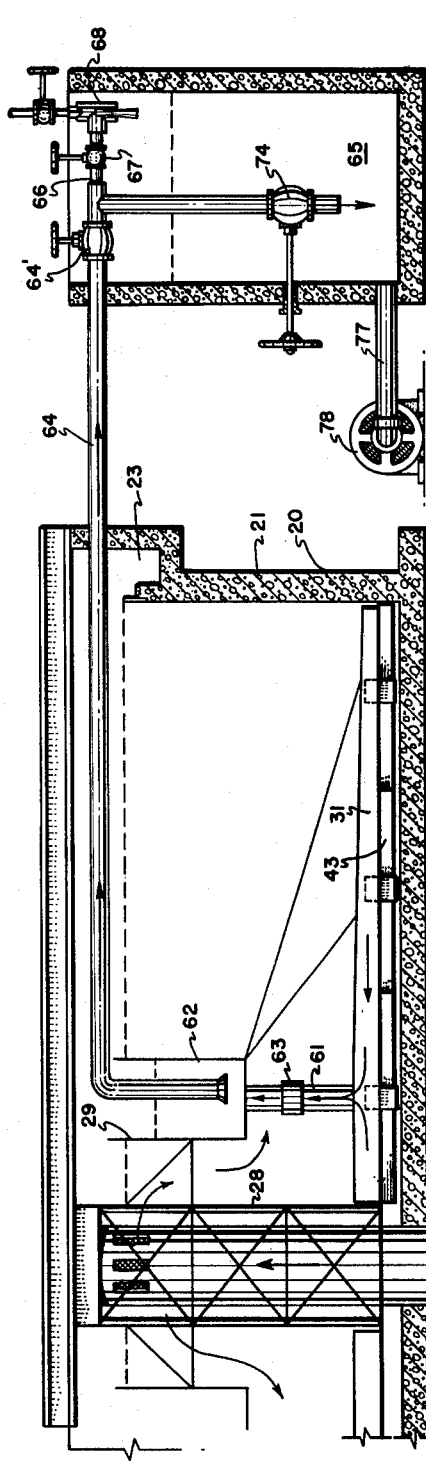
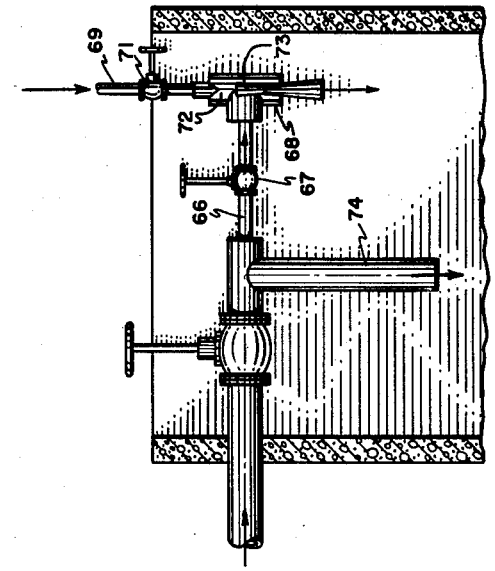
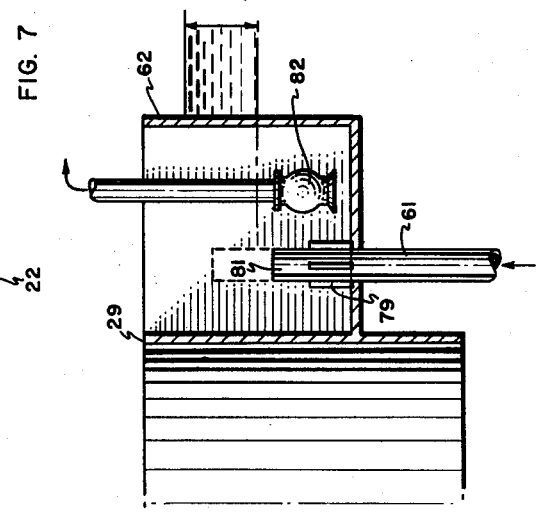
INVENTOR.
EARL M. KELLY
BY Robert R. Finch
attorney.

United States Patent Office
3,166,502
Patented Jan. 19, 1965

3,166,502
SLUDGE DISCHARGE MEANS FOR
SEDIMENTATION APPARATUS
Earl M. Kelly, Hillsborough, Burlingame, Calif., assignor to The Eimco Corporation, Salt Lake City, Utah, a corporation of Delaware
Filed Sept. 12, 1960, Ser. No. 55,592
1 Claim. (Cl. 210—528)

The present invention relates to sedimentation apparatus and in particular to such apparatus adapted to the treatment of sewage in liquid form and similar materials.

In the treatment of sewage and similar liquids a primary object is removal of polluting elements which, if allowed to remain, degrade any stream into which such liquids are discharged by robbing it of essential oxygen.

A familiar treatment for polluted liquids is the biologic oxidation process in which aerobic bacteria oxidize polluting elements into stable non-putrescible compounds. In the well known activated-sludge process of biologic oxidation, such bacteria form nuclei which appear as visible solids in suspension. After oxidation, such solids pass into a sedimentation basin or tank where they are removed from the liquid and returned for reuse in oxidation. Upon leaving oxidation, the solids still require free-oxygen for life and function and tend to draw available dissolved oxygen from liquid in the sedimentation tank. To minimize depletion of oxygen from the sedimentation liquor and in turn maintain life and vigor in the bacteria, it is necessary to quickly return nuclei solids to the aeration section.

The requirements for rapid return of nuclei solids poses the requirement of rapid removal thereof from the sedimentation tank in order to prevent deterioration in quality of tank effluent or variability of bacteria.

Various ways and means have been proposed to effect rapid removal of sewage or other sludge from sedimentation apparatus. Although many prior systems have met with commercial success, no single system has solved all the problems.

For instance, some prior systems do provide for sludge return, but offset this advantage because of the long detention time required to initially collect the sludge.

Other prior systems, although capable of collecting and removing sludge rapidly, suffer from the disadvantage of only partial sludge removal, the remainder of the sludge being detained to discharge by conventional raking mechanisms which, as is well known, require long detention to move peripherally located solids to a center discharge or, conversely, centrally sedimented solids to peripheral discharge. Another disadvantage of such prior systems lies in their inability to produce and handle any but the most dilute sludges of, say, a maximum concentration of 0.5% solids, dry weight basis.

It is a primary object of the present invention to provide, in sedimentation apparatus, sludge removing means capable of collecting sludge from all areas of the sedimentation base or tank bottom simultaneously and to rapidly remove such solids from the sedimentation tank.

Another important object is the provision of ways and means enabling the production of a significantly thicker sludge without resort to additional detention time.

A further object is to provide sludge removing means capable of continuously sweeping the entire tank bottom clean thereby substantially removing all solids from all portions thereof at equal age thereby eliminating the long detention necessary for normal raking of residual solids to a remote discharge.

Still another object is the provision of apparatus capable of employment with a wide variety of associated equipment. That is to say, the present invention provides for sludge removal and is readily adaptable for use in several types of sedimentation equipment.

A still further object is provision of sludge removal means capable of effectively controlling the rate of removal to be uniform with respect to the entire sedimentation base and also to be independently variable as to the total output of the sedimentation tank.

Another object is the provision of means enabling adjustment of removal rates without draining the tank.

A related object is provision of simple siphon means for removal of sludge from sedimentation basins.

The foregoing and other objects are attained by this invention which provides in a sedimentation basin, rake arms, sludge collecting and confining means associated with such arms and rotatable therewith about the axis of the sedimentation basin, means for conducting controlled quantities of confined sludge from the collecting and confining means and for conducting such collected sludge to a central discharge point for removal from sedimentation.

In order that the invention may be more readily understood and carried into effect, reference is made to the accompanying drawings and the description thereof, it being understood that such is offered by way of example only, and is not to be taken as limiting the invention, the scope of which is defined by the appended claims rather than by the description preceding it.

In the drawings:

FIG. 2 is a partial top plan view of the apparatus shown in FIG. 1.

FIG. 3 is an enlarged view, partly in section, of the lower central portion of apparatus of FIG. 1 illustrating details of construction thereof.

FIG. 3a is a further enlargement of a portion of FIG. 3 illustrating details of the cover seal employed in the embodiment of FIG. 3.

FIG. 4 is an enlarged partial top view, partly schematic, of the structure shown in FIGS. 1 and 2, illustrating further details thereof.

FIG. 5 is the view taken in the plane of line 5—5 of FIG. 4.

FIG. 5a is an enlarged partial view of the structure of FIG. 5.

FIG. 6 is a view taken in the plane of line 6—6 of FIG. 4.

FIG. 7 is a partial side sectional view of a sedimentation system embodying a separate modification of the invention utilizing ultimate top removal of sludge, certain parts being shown in elevation for purposes of clarity.

FIG. 8 is an enlarged partial view of the system shown in FIG. 7, illustrating details of a particular sludge removal siphon system useful under certain conditions.

FIG. 9 is an enlarged partial view showing further details of the sludge removal system of FIG. 7 additionally illustrating means enabling control of the total sludge withdrawal rate from the sedimentation basin.

Figure 1:
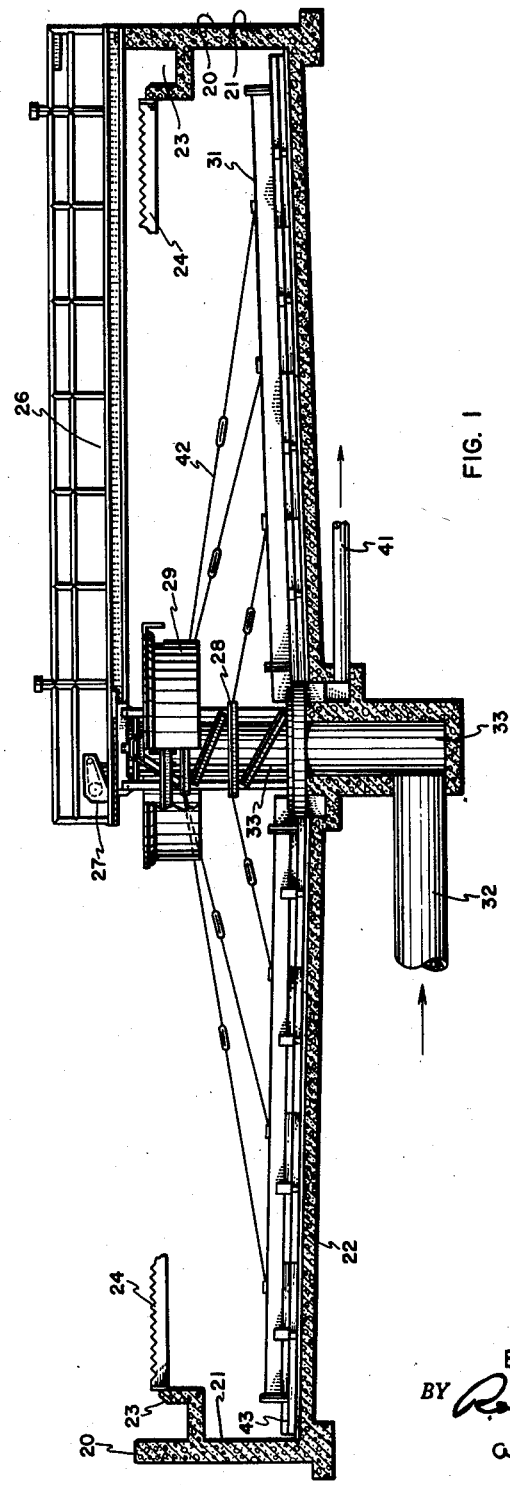
FIG. 1 is a sectional view of sedimentation apparatus embodying the present invention, certain parts being shown in elevation for purposes of clarity.

Referring first to FIGS. 1–6, it will be seen that the sedimentation system comprises a tank 20 having sidewalls 21 and equipped with a bottom or sedimentation base 22. The tank has a usual overflow weir 23 with adjustable top edge plate 24 and is equipped with a usual walkway 26 for access to a drive mechanism 27 mounted to rotatably drive a cage or other structure 28 to which is secured a suitable upper feedwell 29 and lower rake arms generally designated 31 (to be described in more detail hereinafter) which rotate as a unit about the tank axis. Feed may be supplied through conduit 32 into a central conduit 33 which discharges into the feedwell.

As is usual in structures of this type, the center column is fixed and serves as a feed means for influent, which enters through the conduit 32. As is best shown in FIG. 3, the center column is anchored at its base to the center section 34 of the sedimentation base.

As previously noted, cage 28 has secured thereto the rake arms 31 and it will be noted that such rake arms are in the form of a hollow structure having a central sludge passage 36 which communicates with a central annular collecting ring 37 in turn communicating with an annular sludge hopper 38 situated about the base of the center column and connected to a final discharge offset 39 which in turn connects with a usual discharge conduit 41 for final removal of sludge. A suitable pump may be put in the system for applying controlled suction to the sludge pick-up system.

Suitable means, such as tie rods 42, are employed to support and maintain rotation of the arms by the cage.

As is best shown in FIGS. 2 and 4, the sludge raking means are adapted to sweep the entire bottom on a continuous basis. For this purpose there are provided rakes 43 secured to the bottom of the rake arm 31 and mounted in a particular fashion at acute angles thereto to converge and form a series of adjacent sludge collection hoppers 44 extending beyond the leading and trailing edges of the arms. These hoppers are defined at their sides by the rake blades 43 which, as noted, are alternately arranged for outward and inward raking and converge alternately at leading and trailing edges with respect to each other. The tank bottom 22 forms the hopper bottom. The hoppers thus formed have open ends facing the direction of arm rotation. At least the rear portion of each hopper on the trailing side of the arm is covered with a cover plate 46. This is important as it provides a complete confinement for sludge to thereby provide application of hydrostatic force thereto to concentrate and/or force sludge as a confined stream from the point of collection to the eventual outlet. At the lower edge of the rake blade there is desirably provided squeegee blades 47 of any suitably flexible material such as Teflon. These insure clean sweeping of the tank bottom and insure close confinement of the sludge in the hopper.

By confining the sludge against escape except through relatively restricted orifices, conditions are created whereby an important object of the invention namely, sludge concentration, is achieved. This is so because in accordance with the invention, the sludge is concentrated due to compressive pressures exerted in the hoppers. In other words the volume rate of sludge withdrawal from the hoppers can be adjusted to be less than the volume rate of sludge entry thereto thus resulting in compressive concentration of sludge. In tests, activated sludge concentrations in excess of 1.5% have been readily attained.

A sludge removal conduit 48 is provided at the top of each of the hoppers and this conduit, which connects with the confined chamber through a diamond shaped opening 49, in turn connects directly with the interior of the hollow rake arm 31. It is noted that the diamond shaped opening 49 is adapted to be adjustable by means of mounting the plate 51 to be slidable into and out of the sludge removal conduit 48 thereby changing dimensions of the opening 49. This is a highly desirable feature as it enables independent control of discharge or pickup from the sedimentation base into the arm to be such that the base will be uniformly swept on a continuous basis while accommodating for the usual variation in sludge volume and concentration from the center to the periphery of the base. Adjustment while the tank is full is accomplished by means of a rack and pinion arrangement comprising a pinion 50 journalled in a suitable bracket 52 to engage a rack 50' welded to the slidable plate 51. An opening 48' is provided in the curved end wall of conduit 48 to accommodate reciprocating movement of the rack. If desired, a handle 55 may be permanently affixed to the pinion to extend above the water level for ready access. Alternatively, a head 55' may be provided on the pinion to be engaged by a long handled wrench from above. In the latter connection, a funnel 60, as shown in dotted lines in FIG. 5 may be provided to guide the wrench. The assembly may be put together snugly to hold itself in place or may be provided with a lock screw if desired.

Sludge is forced into the confined hoppers or chambers and passes through the arms to be deposited in the center section or sludge ring 37 whence it moves into the annular hopper 38.

To permit rotation of the arms while retaining communication with the annular sludge collecting hopper 38, there is provided a seal arrangement (FIG. 3a) which generally comprises a fixed ring or washer 53 of low-friction material such as Teflon secured to the sedimentation base in any suitable fashion such as by bolt 54, and a second Teflon ring 56 suitably secured to the outer skirt of the collection ring 37 as by bolts 57. The washer is held in contact by a spring-like member 58 which bears against the upper surface thereof to hold it in slideable engagement on the surface of the fixed ring 53.

A similar arrangement is provided on the opposite side edge of the collection ring so that the entire ring is sealed as the arms rotate. Thus, the ring 37 is actually a cover mounted in slideable sealing engagement with the upper side walls of the hopper 38.

In the arrangement shown in FIGS. 1–6, variation of the total sludge withdrawal rate may be simply effected by regulation of the sludge withdrawal pump.

In order to collect material of rapidly settling nature which might deposit on the upper surface of the collecting ring adjacent the center section inboard of the rakes, there is provided a central sludge pickup 59 which sweeps the center section clean and passes sludge so collected into the center sludge collecting hopper.

In installations where it is desired to eliminate a submerged sealing mechanism, a particular feature of the invention provides a superior modification for use in ultimate withdrawal of the sludge from the sedimentation tank without the use of submerged seals or other submerged withdrawal devices.

Such modification is illustrated in FIGS. 7–9. For purposes of illustration the sedimentation apparatus, per se, is similar to that illustrated in FIGS. 1–6 insofar as it pertains to the sedimentation tank and the sludge collecting rakes and arms.

As will best be seen in FIG. 7, the primary difference between the first described modification and that shown in FIGS. 7–9 resides in the manner of withdrawal of sludges once they have been picked up by the rake arm and brought to a point of disposal.

In FIG. 7 there is provided a vertical sludge tube 61 communicating with the interior of arm 31 and mounted to extend upwardly from the top of such arm. This tube in turn connects to an elevated sludge collecting trough 62 which is mounted in concentric overlapping relationship with and as an attachment on the feedwell 29 and rotates therewith. Inasmuch as the annular sludge trough rotates with the arms because of a common connection to the center cage, the vertical tube 61 requires no special connection between the arm and the trough, but to accommodate normal variation due to torque loads and the like, there may be provided a flexible connection such as at 63.

In the arrangement shown, during normal operation sludge will be forced by hydrostatic head upwardly through tube 61 into the trough 62 and will seek a defined level as normally determined by the upper liquid level in the sedimentation tank proper. In order to remove sludge from the trough 62 there is provided a siphon pipe 64, suitably valved as at 64' and 74, having its intake positioned in the lower portion of the trough and terminating at its opposite end in a collecting sump or tank 65. In normal operation, valves 64' and 74 are open while the branch conduit 66 and valve 67 are closed off. Under these conditions, the sludge withdrawal rate is regulated by pump 78 withdrawing sludge through conduit 77. If the pump stops, the system will simply come to balance. It should be noted that the eventual sludge withdrawal rate affects the back pressures in the sludge hoppers 44 thus affords control over the degree of concentration of sludge.

In the event the siphon is interrupted, flow may be reinitated by means of the arrangement shown generally in FIG. 7 and illustrated in detail in FIG. 8. Such arrangement comprises interconnecting branch conduit 66 adapted to be cut in and out of circuit by valve 67 and having an associated venturi arrangement 68. The venturi section comprises a water inlet conduit 69, suitably valved as at 71 and terminating in a center section 72 in which there is positioned a venturi 73.

To start siphon action, it is only necessary to open valve 71 thereby initiating water flow through the venturi 73 thereby creating a vacuum to evacuate air from conduit 64 and draw sludge from the inlet end in the sludge collecting trough through the conduit thence into the sludge collecting pit 65 from whence it may be ultimately discharged via conduit 77. This operation is best carried out with valve 74 closed to avoid drawing diluted material into the conduit. If desired, the venturi arrangement may extend below the liquid level.

The illustrated embodiment presents an extremely efficient and inexpensive system of sludge removal. The only control factor involved in a discharge of this nature is that of simple manual startup after inadvertent suction loss.

For more positive control of the withdrawal rate it is possible to connect the pump directly to the final discharge conduit 74 thereby giving a direct control over the rate of withdrawal of sludge from the trough 62. Alternatively, as shown, the pump may be connected to conduit 77 from which sludge discharges from holding pit 65 to indirectly control sludge withdrawal rate by regulating the level in the sludge holding tank.

In accordance with another feature of the invention, illustrated specifically in FIG. 9, means are provided for controllably and variably limiting the rate of displacement of sludge from the tank bottom. That is to say, means are provided whereby sludge withdrawal is set at a predetermined rate variable by simple operator changes.

Referring to FIG. 9, it will be noted that the vertical tube 61 terminates at the base of the sludge trough 62 just as described in connection with FIG. 7; and there is additionally provided a bracket assembly comprising a series of vertical members 79 spaced about and extending upwardly from the upper terminal of the vertical tube 61. These are arranged to accept and hold in place one or more tube extension or slip rings 81 of any desired length and adapted set in place within the vertical members 79 in axial alignment with the vertical tube 61. The upper level of the extension determines the level to which sludge must rise before discharging into the collecting trough by fixing the back pressure which must be overcome by sludge in order to spill into the trough. A suitable foot valve 82 is attached to the sludge discharge conduit 64 adjacent the bottom of the sludge collecting attachment. In place of slip rings, a telescoping valve may be employed.

From the foregoing description it will be evident that the invention provides a superior sludge pickup mechanism which insures continuous sweeping of the entire sedimentation base and positive confining of the collecting sludge for withdrawal through a conduit forming a part of the rake arms. By special modification, adaptable for use with the sludge pickup arms, novel sludge discharge system is provided which eliminates the necessity for complex underwater seals.

By collecting the sludge at a plurality of paths on the sedimentation base, there is insured continuous clean sweeping of such base. Moreover, all solids are collected and withdrawn as they settle hence are subjected to immediate withdrawal. The feature of adjusting the orifice through which sludge enters the hollow arm enables coordination of withdrawal rate with the desired sludge concentration in the path from which sludge is collected by that orifice.

In order to further control the sludge withdrawal rate from the various paths to the end that a uniform rate is maintained the hollow arm or other sludge conduit should be tapered from end to end.

This invention, by its unique ability to collect and discharge sludge as it settles provides the extreme advantage of rapid sludge removal of uniformly aged sludge thus avoiding the problems of long detention. The ability to control sludge discharge at the individual pickup points as well as the total sludge withdrawal rate provides an unexpected and hitherto unattainable flexibility of control.

I claim:

Sedimentation apparatus comprising a tank having a bottom and upstanding marginal sidewalls, means for supplying solids-bearing liquid to said tank for sedimentation therein to yield effluent liquor and settled sludge, effluent liquor discharge means, a sludge outlet, and means in said tank for collecting settled sludge and transporting it to said sludge outlet, said means comprising a hollow arm mounted in said tank adjacent the bottom thereof and communicating at one end with the sludge outlet, drive means connected to said arm enabling movement of said arm across said bottom, a plurality of straight blades dependingly mounted on said arm at spaced apart points therealong and transversely at acute angles thereto, alternate ones of said blades being mounted oppositely to the others of said blades whereby adjacent blades converge to collectively form the sidewalls of a plurality of adjacent sludge collecting and concentrating hoppers closed at the rear and tapering continuously from said rear to an opening at the front facing the direction of movement of said arm, a cover plate interconnecting the top of adjacent sidewalls at least in a rear portion of each of said hoppers thereby to form between said walls, said cover and the tank bottom a confined sector that continuously diminishes in volume on approach to the rear thereof, separate sludge conducting conduits providing communication between the rear of said covered portion of each of said hoppers and the interior of said hollow arm, and flow-restricting orifice means in each of said sludge conducting conduits having an effective open area less than the cross sectional area of the forwardly facing sludge entrance area of each of said associated hoppers.

References Cited in the file of this patent
UNITED STATES PATENTS

| | | |
|---|---|---|
| 343,069 | Rosewater | June 1, 1886 |
| 2,150,865 | Shafer et al. | Mar. 14, 1939 |
| 2,236,128 | Poole | Mar. 25, 1941 |
| 2,355,716 | Weeden | Nov. 30, 1943 |
| 2,922,524 | Rankin | Jan. 26, 1960 |
| 2,980,934 | Steindorf | Apr. 25, 1961 |